United States Patent
Young et al.

(10) Patent No.: US 10,928,898 B2
(45) Date of Patent: Feb. 23, 2021

(54) AUGMENTED REALITY SAFETY

(71) Applicant: International Business Machines Corporation, Armonk, NY (US)

(72) Inventors: Rebecca D. Young, Toronto (CA); Stewart J. Hyman, Richmond Hill (CA); Manvendra Gupta, Mississauga (CA); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/238,711

(22) Filed: Jan. 3, 2019

(65) Prior Publication Data

US 2020/0218341 A1 Jul. 9, 2020

(51) Int. Cl.
*G06F 3/01* (2006.01)
*G08B 21/18* (2006.01)
*G08B 21/02* (2006.01)
*G08B 7/06* (2006.01)
*G08B 6/00* (2006.01)

(52) U.S. Cl.
CPC ............ *G06F 3/013* (2013.01); *G06F 3/016* (2013.01); *G08B 6/00* (2013.01); *G08B 7/06* (2013.01); *G08B 21/02* (2013.01); *G08B 21/182* (2013.01)

(58) Field of Classification Search
CPC ................................ G06F 3/013; G08B 21/02
See application file for complete search history.

(56) References Cited

U.S. PATENT DOCUMENTS

| 6,728,636 | B2 | 4/2004 | Kokojima et al. |
| 7,613,426 | B2 | 11/2009 | Kuehnel et al. |
| 7,850,306 | B2 | 12/2010 | Uusitalo et al. |
| 9,132,342 | B2 | 9/2015 | Balachandreswaran et al. |

(Continued)

FOREIGN PATENT DOCUMENTS

CN 105405154 A 3/2016

OTHER PUBLICATIONS

Venezia et al., "Context Awareness aims at novel fruition models: Augmented Reality may be the killer application for Context Awareness", 2010 IEEE/IFIP International Conference on Embedded and Ubiquitous Computing, Dec. 11-13, 2010, 5 pages.

(Continued)

*Primary Examiner* — Phi Hoang
(74) *Attorney, Agent, or Firm* — James L. Olsen

(57) ABSTRACT

Embodiments of the present disclosure relate to augmented reality (AR) safety enhancement. In embodiments, an eye-gaze time indicating a period in which a user using an AR application is viewing a screen of a mobile device running the AR application can be determined. The eye-gaze time can then be compared to an eye-gaze threshold. In response to a determination that the eye-gaze time exceeds the eye-gaze threshold, an alert can be issued to the mobile device running the AR application. In embodiments, a set of proximity data can be received. The set of proximity data can be analyzed to determine a number of nearby devices. A determination can be made whether the number of nearby devices exceeds a safety threshold. When a determination is made that the number of nearby devices exceeds the safety threshold, an alert can be issued to a device having a running AR application.

18 Claims, 9 Drawing Sheets

(56) References Cited

U.S. PATENT DOCUMENTS

| | | | |
|---|---|---|---|
| 9,352,216 | B2 | 5/2016 | Mullen |
| 10,360,437 | B2 | 7/2019 | Obaidi et al. |
| 10,564,714 | B2 | 2/2020 | Marggraff et al. |
| 2003/0210228 | A1 | 11/2003 | Ebersole et al. |
| 2012/0122570 | A1 | 5/2012 | Baronoff |
| 2013/0044130 | A1 | 2/2013 | Geisner et al. |
| 2013/0135196 | A1 | 5/2013 | Park et al. |
| 2014/0168056 | A1 | 6/2014 | Swaminathan et al. |
| 2015/0186234 | A1* | 7/2015 | Hofman .............. G06F 11/26 714/43 |
| 2015/0301599 | A1 | 10/2015 | Miller |
| 2016/0124502 | A1 | 5/2016 | Sawyer et al. |
| 2017/0245237 | A1* | 8/2017 | Thompson ............ H04W 4/029 |
| 2017/0344707 | A1* | 11/2017 | Patel .................... G08G 1/202 |
| 2019/0147368 | A1* | 5/2019 | Pinel ..................... G08G 1/14 706/12 |
| 2019/0221191 | A1 | 7/2019 | Chhipa et al. |
| 2019/0294239 | A1* | 9/2019 | Suzuki .............. G02B 27/0179 |

OTHER PUBLICATIONS

Bornemark et al., "Gaze-supported Interaction with Smart Objects through an Augmented Reality User Interface", Faculty of Technology and Society Computer Science, Bachelor's Thesis, May 30, 2017, 41 pages.

Pyae et al., "A Player Engagement Model for an Augmented Reality Game: A Case of Pokémon Go", Proceedings of the 28th Australian Conference on Computer-Human Interaction, Nov. 29-Dec. 2, 2016, 5 pages.

Unknown, "Augmented Reality Games and Public Safety", 4 pages http://www.maplevalleywa.gov/home/showdocument?id=13961.

Mell et al., "The NIST Definition of Cloud Computing", Recommendations of the National Institute of Standards and Technology, Sep. 2011, 7 pages.

Young et al., "Augmented Reality Safety", Application No. 202010008234.6, Filed Jan. 3, 2020.

* cited by examiner

AUGMENTED REALITY SAFETY

BACKGROUND

The present disclosure relates generally to the field of augmented reality, and in particular to augmented reality safety.

Augmented reality (AR) mobile applications leverage sensor data to emulate augmented environments. For example, an AR mobile application can utilize global positioning system (GPS) technology, cameras, gyroscopes, accelerometers, etc. to augment a virtual environment within the application. The augmented environment can include virtual destinations and/or objects, which can be displayed to a user via a geographic map and/or through a camera view.

SUMMARY

Embodiments of the present disclosure include a method, computer program product, and system for enhancing the safety within an augmented reality (AR) environment. In embodiments, an eye-gaze time indicating a period in which a user using an AR application is viewing a screen of a mobile device running the AR application can be determined. The eye-gaze time can then be compared to an eye-gaze threshold. In response to a determination that the eye-gaze time exceeds the eye-gaze threshold, an alert can be issued to the mobile device running the AR application.

In embodiments, a set of proximity data can be received. The set of proximity data can be analyzed to determine a first number of nearby devices. A determination can be made whether the first number of nearby devices exceeds a first safety threshold. When a determination is made that the first number of nearby devices exceeds the safety threshold, an alert can be issued to a device having a running AR application.

In embodiments, a user position of a user using a mobile device having a running AR application can be received. Further, a sought destination position for at least one virtual destination can be received. The user position can be compared to the sought destination position at a first time to determine a first distance between the user position and the sought destination. When the distance satisfies a proximity threshold, an alert can be issued to the mobile device having the running AR application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
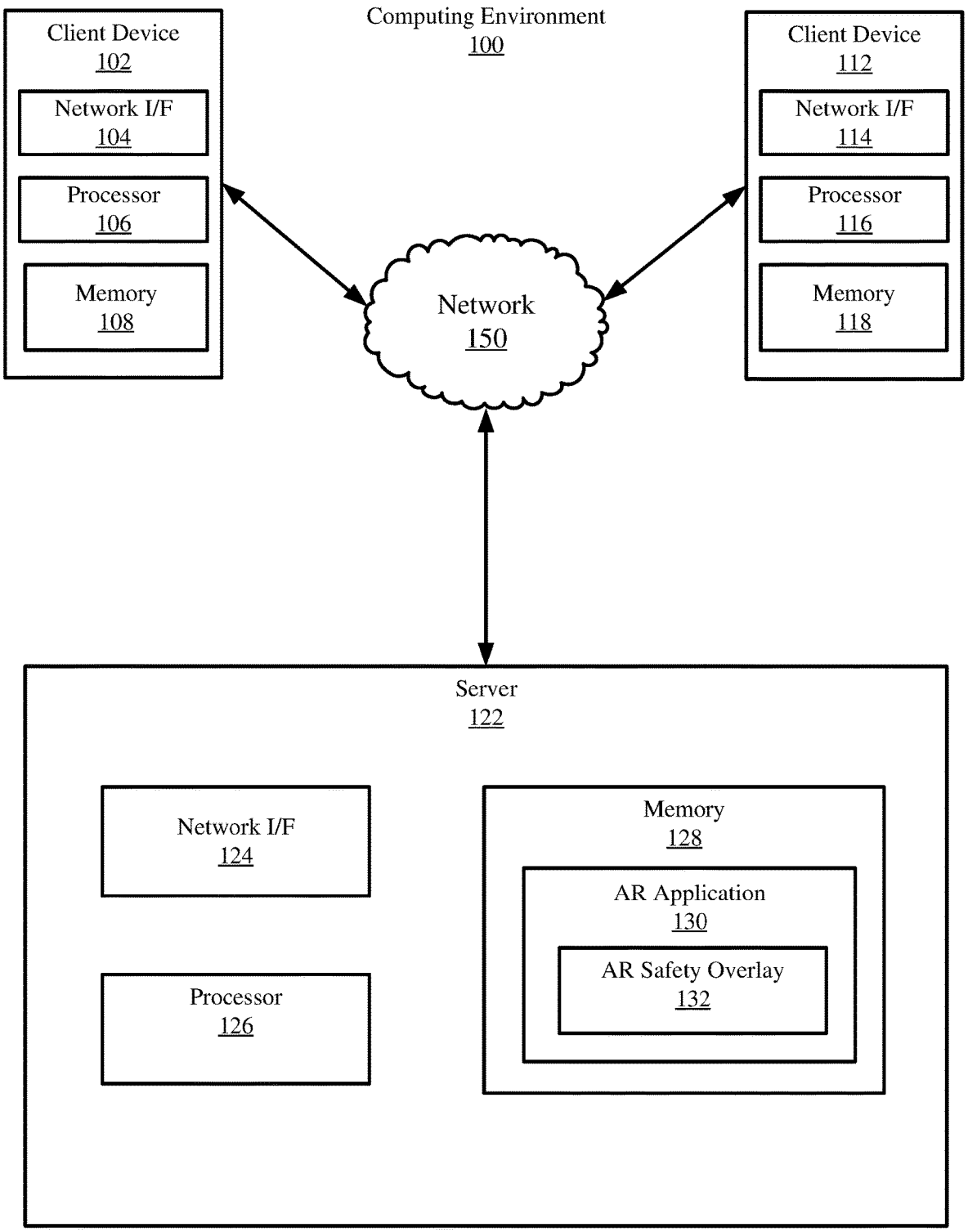
FIG. 1 depicts a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of augmented reality, and in particular to augmented reality safety. While the present disclosure is not necessarily limited to such applications, various aspects of the disclosure may be appreciated through a discussion of various examples using this context.

Augmented reality (AR) mobile applications leverage sensor data to emulate augmented environments. For example, an AR mobile application can utilize global positioning system (GPS) technology, cameras, gyroscopes, accelerometers, etc. to generate an augmented environment within the application. The augmented environment can include virtual destinations and/or objects, which can be displayed to a user via a geographic map and/or through a camera view.

When a user utilizes an AR mobile application, the user may frequently view their mobile device to track their location with respect to virtual objects and/or destinations. These virtual objects and/or destinations can be placed in various locations such as, for example, restaurants, parks, monuments, streets, churches, stores, etc. In some AR applications, the virtual objects and/or destinations may be scattered randomly throughout a particular environment. To access the virtual objects and/or destinations on the AR mobile application, the user may be required to physically travel through the environment to a location corresponding to the location of the virtual objects/destinations. Upon reaching the physical location of a virtual object and/or destination, the user can interact with the virtual object and/or destination.

AR applications pose serious safety concerns for users. For example, because users are frequently viewing their mobile device to track virtual objects and/or destination, the users may not be aware of their surroundings in the real world. This is amplified when many users are immersed in the same AR environment in a given area. Further, because virtual objects and/or locations can be randomly scattered throughout the real world, these virtual objects and/or locations can be disposed at dangerous locations (e.g., cliff sides, water bodies, busy streets, etc.).

Aspects of the present disclosure address the aforementioned complications via an AR safety overlay. The AR safety overlay can have various features to enhance safety for users using an AR application. In embodiments, the AR safety overlay employs the use of eye-tracking technology. The eye-tracking technology can be configured to determine an amount of time a user is viewing their device while using an AR application. This can be used to warn the user when they are viewing their screen beyond a predetermined time period. In embodiments, the AR safety overlay includes a proximity detector configured to determine a number, speed, and/or trajectory of nearby devices. This can be used to warn a user if they are in a particularly dangerous area. Further, this information can be used to classify locations within the AR environment based on safety. In embodiments, the AR safety overlay can include a position comparator. The position comparator can be used to track a user's location (e.g., a device of the user) with respect to a sought virtual object and/or destination. Based on the distance between the user's location and the sought virtual object or destination, one or more notifications can be triggered, allowing the user to approach the virtual object or destination without the need to continuously view their device.

These improvements and/or advantages are a non-exhaustive list of example advantages. Embodiments of the present disclosure exist which can contain none, some, or all of the aforementioned advantages and/or improvements.

Turning now to the figures, FIG. 1 depicts a block diagram of an example computing environment 100 in which illustrative embodiments of the present disclosure can be implemented. The computing environment 100 includes two client devices 102 and 112 and a server 122.

Consistent with various embodiments, the server 122 and the client devices 102 and 112 can be computer systems. The client devices 102 and 112 and the server 122 can include one or more processors 106, 116, and 126 and one or more memories 108, 118, and 128, respectively. The client devices 102 and 112 and the server 122 can be configured to communicate with each other through an internal or external network interface 104, 114, and 124. The network interfaces 104, 114, and 124 can, in some embodiments, be modems or network interface cards. The client devices 102 and 112 and/or the server 122 can be equipped with a display or monitor. Additionally, the client devices 102 and 112 and/or the server 122 can include optional input devices (e.g., a keyboard, mouse, scanner, or other input device), and/or any commercially available or custom software (e.g., browser software, communications software, server software, AR software, positioning system software, eye-tracking software, search engine and/or web crawling software, etc.). In some embodiments, the client devices 102 and 112 and/or the server 122 can be servers, desktops, laptops, or hand-held devices.

The client devices 102 and 112 and the server 122 can be distant from each other and communicate over a network 150. In some embodiments, the server 122 can be a central hub from which client devices 102 and 112 can establish a communication connection, such as in a client-server networking model. Alternatively, the server 122 and client devices 102 and 112 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the client devices 102 and 112 and the server 122 can be local to each other and communicate via any appropriate local communication medium. For example, the client devices 102 and 112 and the server 122 can communicate using a local area network (LAN), one or more hardwire connections, a wireless link or router, or an intranet. In some embodiments, the client devices 102 and 112 and the server 122 can be communicatively coupled using a combination of one or more networks and/or one or more local connections. For example, the first client device 102 can be hardwired to the server 122 (e.g., connected with an Ethernet cable) while the second client device 112 can communicate with the server 122 using the network 150 (e.g., over the Internet).

In some embodiments, the network 150 may be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

In embodiments, the server 122 includes an augmented reality (AR) application 130. The AR application 130 can be configured to provide an augmented environment having one or more virtual objects and/or destinations disposed at physical locations in the real-world. In some embodiments, the AR application may be a game which enables users to interact with virtual objects and/or locations by traveling to physical locations corresponding to locations of the virtual objects and/or destinations. In some embodiments, the AR application 130 can include a web mapping service (not pictured) configured to aid users in route planning to physical locations in the real world.

In embodiments, the AR application 130 can be dispatched from the server 122 for installation on the client devices 102 and 112. In some embodiments, the AR application 130 can be provisioned from the server 122 to the client devices 102 and 112, such that installation on the client devices 102 and 112 is not necessary.

The AR application 130 can leverage client device 102 and 112 features to generate an augmented environment. For example, the AR application 130 can utilize geographic/location data of the client devices 102 and 112 to generate one or more virtual objects and/or destinations at particular real-world locations. As an example, one or more virtual objects and/or destinations can be disposed on an electronic map at particular points of interest (e.g., a restaurant, a monument, etc.), coordinates (e.g., longitudes/latitudes), addresses, etc. Further, the AR application 130 can utilize camera features of the client devices 102 and 112 to display the virtual objects and/or destinations through a camera view. As another example, the AR application 130 can utilize gyroscope/accelerometer data of the client devices 102 and 112 to determine device movement (e.g., trajectory and speed) with respect to virtual objects and/or destinations. In some embodiments, the AR application 130 can utilize geographic/location data to guide route planning for users to physical locations.

As depicted in FIG. 1, the AR application 130 includes an augmented reality safety overlay (ARSO) 132. In some embodiments, the ARSO 132 can be included as a software package of the AR application 130. In some embodiments, the ARSO 132 can be installed separately from the AR application 130. In these embodiments, the ARSO 132 can be called (e.g., initiated) upon execution of (e.g., launching) the AR application 130. For example, the ARSO 132 can be stored at the operating system (OS) level, and in response to a determination that an AR application (e.g., AR application 130) is launched, the ARSO 132 can be initiated.

The ARSO 132 can be configured to enhance safety for users accessing the AR application 130 via the client devices 102 and 112. For example, the ARSO 132 can be configured to collect eye-tracking data to notify users when they are viewing their devices beyond a predetermined period. This can prevent collisions, missteps, and/or entrance into dangerous areas. As another example, the ARSO 132 can be configured to determine the number, speed, and/or trajectory of nearby devices. This information can be utilized to warn a user if they are in a dangerous location (e.g., a location within many moving vehicles or bikes, a crowded location with high risk of collision, etc.). The ARSO 132 can further be configured to notify viewers when they arrive at (e.g., or approach) a particular destination (e.g., physical or virtual), without requiring the viewer to constantly view their device. The data collected/generated by the ARSO 132 can then be analyzed to construct safety profiles for respective locations within the world. These features of the ARSO 132 will be further discussed with reference to FIGS. 2-6.

While FIG. 1 illustrates a computing environment 100 with a single server 122 and two client devices 102 and 112, suitable computing environments for implementing embodiments of this disclosure can include any number of client devices and servers. The various models, modules, systems, and components illustrated in FIG. 1 may exist, if at all, across a plurality of servers and client devices. For example, some embodiments may include two servers. The two servers may be communicatively coupled using any suitable communications connection (e.g., using a WAN, a LAN, a wired connection, an intranet, or the Internet).

It is noted that FIG. 1 is intended to depict the representative major components of an exemplary computing environment 100. In some embodiments, however, individual components can have greater or lesser complexity than as represented in FIG. 1, components other than or in addition to those shown in FIG. 1 may be present, and the number, type, and configuration of such components may vary. For example, in some embodiments, the ARSO 132 is not stored within the AR application 130. In these embodiments, the ARSO 132 can be stored separately (e.g., at the OS level, within another application, in a file, etc.) and initiated upon launching (e.g., or separately executed by a user at any suitable time) the AR application 130.

Figure 2:
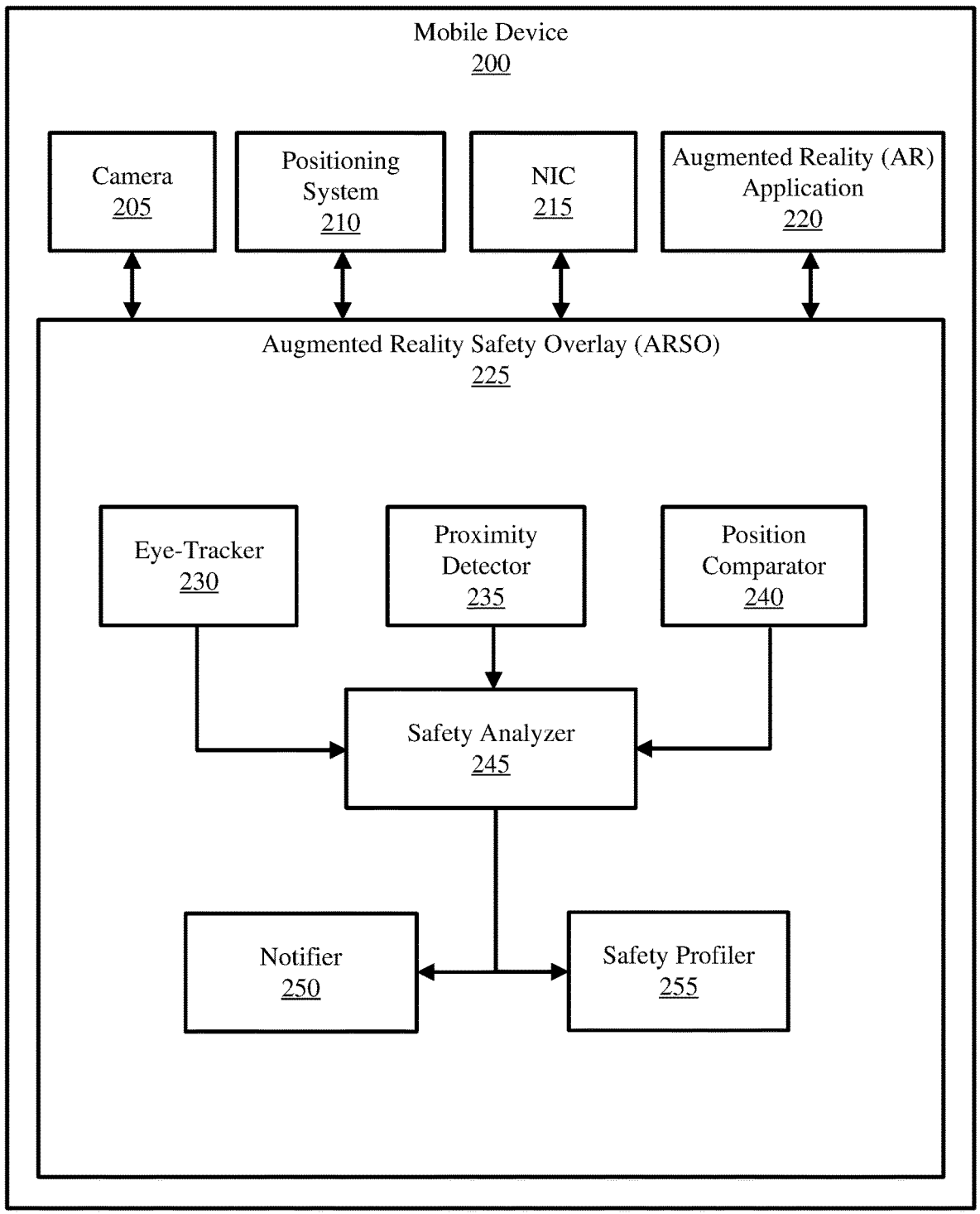
FIG. 2 depicts of a block diagram of a mobile device having an augmented reality safety overlay, in accordance with embodiments of the present disclosure.

Referring now to FIG. 2, shown is a mobile device 200 (e.g., client devices 102 and 112 of FIG. 1) implementing an augmented reality safety overlay (ARSO) 225 (e.g., ARSO 132 of FIG. 1), in accordance with embodiments of the present disclosure. The mobile device 200 can include various components. For example, the mobile device 200 can include computer components such as a processor (e.g., a multi-core central processing unit (CPU)), a storage system (e.g., a solid-state drive (SSD) or hard disk drive (HDD)), and a main memory (e.g., random access memory (e.g., RAM)). For simplicity, these components are not depicted in FIG. 2.

As shown in FIG. 2, the mobile device 200 includes a camera 205, a positioning system 210, a network interface controller (NIC) 215, and an augmented reality (AR) application 220. The camera 205, positioning system 210, NIC 215, and AR application 220 are communicatively coupled to the ARSO 225. The ARSO 225 utilizes the data obtained from the camera 205, positioning system 210, and NIC 215 to enhance the safety of the AR application 220.

In particular, an eye-tracker 230, a proximity detector 235, and a position comparator 240 of the ARSO 225 use data obtained from the camera 205, positioning system 210, and NIC 215 to enhance the safety of the AR application 220. A safety analyzer 245 of the ARSO 225 analyzes the data obtained from the eye-tracker 230, proximity detector 235, and position comparator 240 to determine whether conditions are safe and/or whether notifying a user of the mobile device 200 is warranted. If the safety analyzer 245 determines that the user of the mobile device 200 should be notified, a command can be dispatched to a notifier 250 such that the user can be warned. Further, the data analyzed by the safety analyzer 245 can be dispatched to a safety profiler 255, which can be configured to associate the safety data (e.g., analyzed by the safety analyzer 245) with particular locations and generate safety scores (e.g., classify locations based on safety) for respective locations.

The eye-tracker 230 of the ARSO 225 can be configured to determine an amount of time a user is viewing a display (not shown) of the mobile device 200. To do so, the eye-tracker 230 can obtain visual data from the camera 205. The camera 205 can include both an outward-facing camera and a front-facing camera. The front-facing camera may be oriented toward a user using the mobile device 200. Thus, in some embodiments, the eye-tracker 230 can utilize data obtained from a front-facing camera (e.g., of the camera 205) to determine the amount of time a user is viewing the display.

In some embodiments, the eye-tracker 230 can utilize data obtained from additional sources to determine the amount of time a user is viewing the display of the mobile device 200. For example, the eye-tracker 230 can utilize eye-attached tracking data (e.g., from smart contact lenses worn by a user), data from a head mounted display (HMD) (e.g., smart glasses) worn by a user, or data from another eye-tracking device (e.g., an electric potential eye-tracker) to determine the amount of time a user is viewing the display of the mobile device 200. This data can be received by the eye-tracker 230 via the NIC 215.

To determine the amount of time a user is viewing the display, the eye-tracker 230 can be configured to analyze eye position/movement over time. For example, the eye-tracker 230 can be configured to track eye position/movement via eye-attached tracking (e.g., devices attached to the eye which track eye movements), optical tracking (e.g., by comparing the position of eye features (e.g., the pupil) with respect to a frame of reference (e.g., a reflection of light off the eye), and/or electric potential tracking (e.g., by measuring electric potential associated with electrodes placed around the eyes). Based on the eye position/movement over time, the eye-tracker 230 determines the amount of time a user is viewing the display in-real time (e.g., an eye-gaze time). For example, if the user eye position indicates that a user is viewing the screen (e.g., a location the user is determined to be viewing corresponds to the location of the mobile device 200 display), an eye-gaze timer can initiate until the user looks away from the screen.

The safety analyzer 245 receives the eye-gaze time (e.g., the time period in which the user is consecutively viewing the display of the mobile device 200) from the eye-tracker 230 and determines whether an eye-gaze threshold (e.g., a threshold which defines an amount of time a user is permitted to view the display of the mobile device 200 without looking away) is exceeded. For example, if an eye-gaze threshold for viewing the display of the mobile device 200 is defined as 4 seconds, and the eye-tracker 230 data indicates that a user has been viewing the display of the mobile device 200 for 3 seconds, a determination can be made that the eye-gaze threshold is not exceeded. However, if the eye-tracker data indicates that a user is viewing the display of the mobile device 200 for 5 seconds, a determination can be made that the eye-gaze threshold is exceeded. If the safety analyzer 245 determines that the eye-gaze threshold is exceeded, the safety analyzer 245 can dispatch a command to the notifier 250 to warn the user viewing the mobile device 200. Further, the breach in the eye-gaze threshold can be stored and used later by the safety profiler 255 for classifying respective locations based on safety.

By ensuring that a user is not viewing the screen for a prolonged consecutive period, the safety of the use of the AR application 220 can be enhanced. For example, ensuring a user looks up at least every "X" seconds (e.g., based on an eye-gaze threshold) can prevent collisions, missteps, or entrance into dangerous territories (e.g., a busy street, a cliff side, etc.). Eye-tracking techniques will be further discussed with reference to FIG. 3.

The proximity detector 235 can be configured to determine the number, speed, and/or trajectory of devices in the vicinity of the mobile device 200. In some embodiments, the proximity detector 235 can be configured to determine the number, speed, and/or trajectory of devices using data received via the NIC 215. For example, the NIC 215 may receive data from one or more applications (e.g., a map application, a social networking application, AR application 220, etc.) which track the location of user devices (e.g., to measure traffic, to identify nearby friends, etc.) using positioning technology. These applications may acquire GPS coordinates for respective devices, which can be updated over time. The GPS data from these applications can be collected by the proximity detector 235 to determine the number, speed, and/or trajectory of nearby devices. For example, the number of devices within a given radius (e.g., 10 feet, 50 feet, 100 feet, 1 mile, etc.) of the mobile device 200 (based on the acquired GPS data) can be used to determine a number of devices in the nearby vicinity. Further, the location of the respective devices over time can be measured to determine the speed of these respective devices. By measuring the time period between two GPS measurements for a given device, the speed and trajectory of the device can be approximated.

In some embodiments, the proximity detector 235 can determine the number, speed, and/or trajectory of nearby devices using wireless positioning technology. These technologies include, but are not limited to Wi-Fi, Bluetooth Low Energy (BLE), Radio-frequency Identification (RFID), and Ultra-wideband (UWB). Signals (e.g., the speed, strength, and/or angle of signals) traveling between transmitters (e.g., a first mobile device) and receivers (e.g., a second mobile device) can be used to approximate location. For example, Time of Arrival (TOA), Received Signal Strength Indicator (RSSI), and/or Angle of Arrival (AOA) analyses can be used to approximate the position of a device communicating with the mobile device 200. By measuring the location of the nearby devices with respect to the mobile device over time, the speed of nearby devices can be calculated (e.g., by measuring the time period between two measured locations).

The number, trajectory, and/or speed of nearby devices are then dispatched to the safety analyzer 245. The safety analyzer 245 can then use this data to determine whether a notification is warranted by the notifier 250. For example, the safety analyzer 245 may set one or more safety thresholds defining conditions in which notifications should be triggered. These safety thresholds can be based on the number of devices within the vicinity (e.g., if the number of devices exceeds a threshold, a notification is transmitted), the speed of devices within the vicinity (e.g., if any device exceeds a speed threshold, a notification is transmitted), the trajectory of nearby devices (e.g., whether two devices are likely to cross paths), etc.

Additionally, the safety analyzer 245 can transmit the number, speed, and/or trajectory of devices in the vicinity of the mobile device 200 to the safety profiler 255. The safety profiler 255 can utilize this information to classify locations based on safety considerations. For example, a location with many high-speed devices can be classified as "dangerous" while a location with few low-speed devices can be classified as "safe." Classification techniques for locations will be further discussed with reference to FIG. 6.

By considering the number, speed, and/or trajectory of nearby devices, the safety of the augmented environment can be enhanced. For example, by issuing notifications based on the number, speed, and/or trajectory of devices, users can quickly become aware of their surroundings while using the augmented reality application 220. This can allow users to continuously receive updates regarding the safety of new areas they enter. Further, by profiling locations based on the historic number, speed, and/or trajectory of devices which enter these areas, users can make informed decisions on where to travel in the future while using the AR application 220. The techniques of the proximity detector 235 will be further discussed with reference to FIG. 4.

The position comparator 240 can be configured to compare the location of the mobile device 200 to the position of one or more sought destinations (e.g., physical locations and/or locations of virtual objects/destinations) associated with the AR application 220. To do so, the position comparator 240 receives mobile device 200 location data from the positioning system 210 and compares the mobile device 200 position to positions of sought destinations indicated on an AR map of the AR application 220. This can be used to provide notifications to users attempting to arrive at particular virtual objects/destinations.

The safety analyzer 245 receives the position comparison data from the position comparator and determines whether a notification should be issued by the notifier 250. This determination can be based on one or more thresholds. For example, a notification can be triggered based on a predetermined distance between the mobile device 200 and a virtual destination. By notifying the user of the mobile device 200 as they approach virtual objects/destinations, the amount of time the user has to view a display of the mobile device 200 is decreased. Position comparison techniques will be further discussed with reference to FIG. 5.

It is noted that in some embodiments the functions of the eye-tracker 230, proximity detector 235, position comparator 240, safety analyzer 245, notifier 250, and safety profiler 255 can be processor executable instructions that can be executed by a dedicated or shared processor using received input (e.g., from the camera 205, positioning system 210, NIC 215, and/or AR Application 220).

Figure 3:
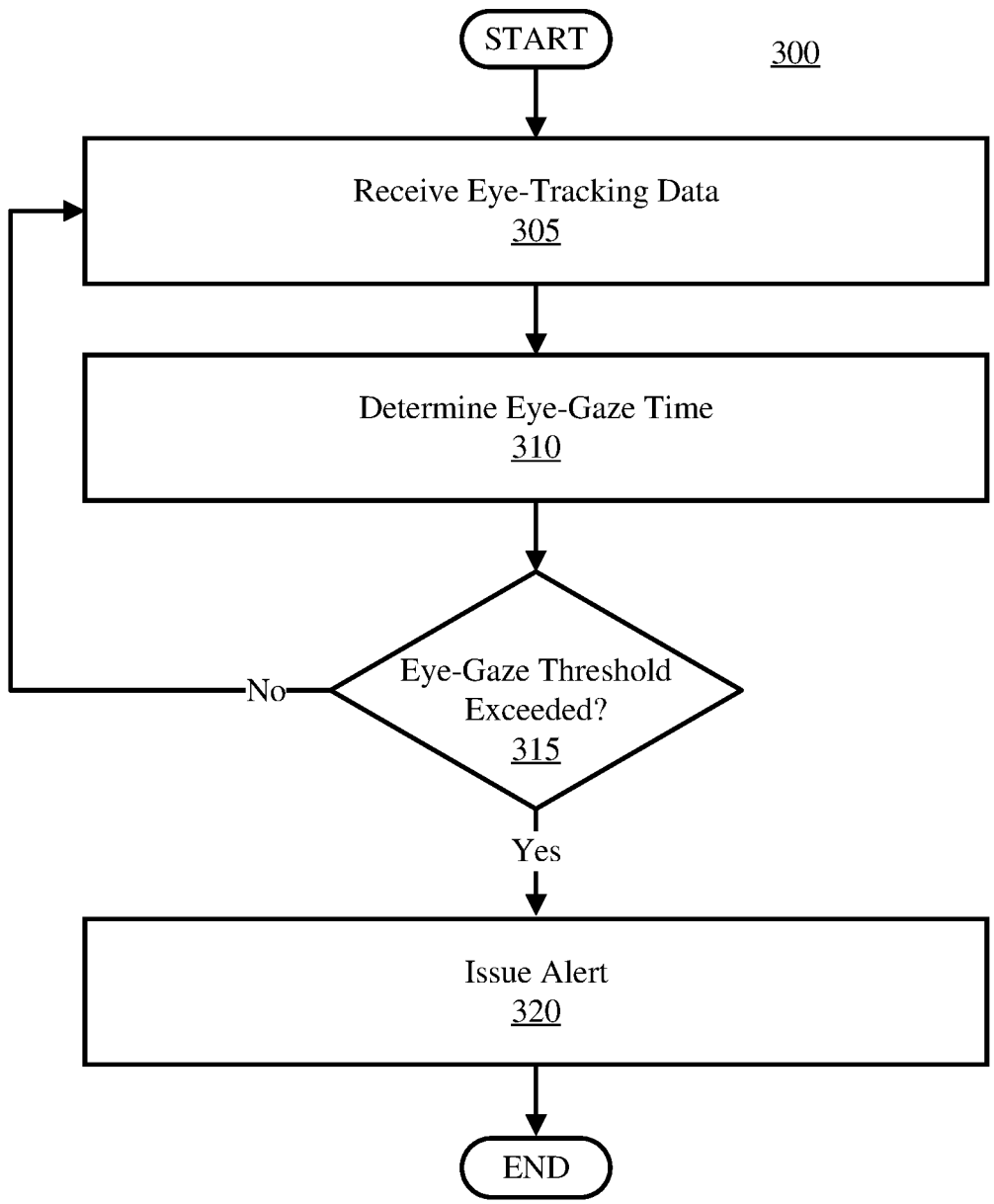
FIG. 3 illustrates a flow diagram of an example method for enhancing safety of an AR application by using eye-tracking, in accordance with embodiments of the present disclosure.

FIG. 3 is a flow diagram illustrating an example method 300 for enhancing safety of an AR application (e.g., AR application 130 of FIG. 1 or 220 of FIG. 2) using eye-tracking, in accordance with embodiments of the present disclosure.

Method 300 initiates at operation 305, where eye-tracking data is received (e.g., by mobile device 200 of FIG. 2). The eye-tracking data can be received from any suitable source. For example, the eye-tracking data can be received from a camera on a mobile device where the AR application is installed. In some embodiments, the eye-tracking data can be received over a network. For example, the eye-tracking data can be received from eye-attached tracking devices (e.g., smart contact lenses), a head mounted display (e.g., smart glasses), or an eye-tracking device (e.g., an electric potential eye-tracking device). In embodiments, the eye-tracking data can be produced via eye-tracking software. The eye-tracking software may perform eye-tracking analysis based on eye-attached tracking, optical eye-tracking, and/or electric potential eye-tracking. The eye-tracking analysis may include the locations (e.g., coordinates) where a user's eyes are looking over time.

An eye-gaze time is then determined. This is illustrated at operation 310. The eye-gaze time can be determined based on the number of consecutive seconds a user has been viewing a display (e.g., a screen) of their device (e.g., as indicated in the eye-tracking data received at operation 305). For example, if the eye-tracking data received at operation 305 indicates that a user has been viewing their screen for 10 consecutive seconds, the eye-gaze time would be determined to be 10 seconds.

A determination is then made whether an eye-gaze threshold is exceeded. This is illustrated at operation 315. The eye-gaze threshold defines the permitted screen eye-gaze time. The eye-gaze threshold can be defined in any suitable manner.

In some embodiments, the eye-gaze threshold can be set to a fixed value (e.g., manually by a user). For example, assuming an eye-gaze threshold is set to 10 seconds, if a screen eye-gaze time is determined to be 11 seconds, then a determination is made that the eye-gaze threshold is exceeded.

In some embodiments, the eye-gaze threshold is dynamically determined/adjusted. In some embodiments, the eye-gaze threshold can be determined based on surrounding geographic data (e.g., as indicated by a positioning system). For example, if data from a positioning system indicates that a user is approaching an environmental hazard (e.g., a body of water or a rapid change in altitude), the eye-gaze threshold can be initially set to a low value or automatically reduced (e.g., from a manually set value). As an example, assume a manual eye-gaze threshold is initially set to 20 seconds. If a user then approaches a lake (e.g., based on analysis of data obtained from a positioning system), the eye-gaze threshold can be automatically reduced to 10 seconds.

In some embodiments, the eye-gaze threshold can depend on a number, speed, and/or trajectory of surrounding vehicles (e.g., indicated by the proximity detector 235 of FIG. 2). For example, assume an eye-gaze threshold is initially manually set to 15 seconds. Further, assume that based on the observation of 10 nearby devices, the eye-gaze threshold is automatically reduced. In this example, if 14 nearby devices are detected by the device (e.g., a determination is made that the observed number of nearby devices exceeds the threshold number of 10 devices) having the AR application, the eye-gaze threshold can be automatically reduced to 5 seconds. This can be completed to ensure the user's eyes are not fixed on their device while multiple other devices are moving nearby.

As another example, assume that the eye-gaze threshold is dependent on the speed of nearby devices. Further, assume that if any device surpasses 25 mph, a determination can be made that the eye-gaze threshold should to be set to a low value. In this example, if a nearby device moving beyond 25 mph is detected, the eye-gaze threshold can be initially set to a low value (e.g., 3 seconds).

In some embodiments, the eye-gaze threshold can depend on a safety classification of a particular location (e.g., based on a safety score generated by the safety profiler 255 of FIG. 2). In these embodiments, the magnitude of the eye-gaze threshold can depend on a safety rating of a particular location. For example, if a region is classified as "dangerous," (e.g., based on the location having a low safety score), the eye-gaze threshold can be set to a low value (e.g., 5 seconds). In contrast, if a region is classified as "safe," (e.g., based on the location having a high safety score), the eye-gaze threshold can be set to a high value (e.g., 20 seconds).

In some embodiments, the eye-gaze threshold is automatically adjusted based on the movement of the device having the AR application (e.g., mobile device 200). For example, at a first speed (e.g., stationary) of the device, a first eye-gaze threshold can be set (e.g., 20 seconds), at a second speed of the device (e.g., 2 mph), a second eye-gaze threshold can be set (e.g., 10 seconds), and at a third speed (e.g., 5 mph) of the device, a third eye-gaze threshold can be set (e.g., 5 seconds). This can be implemented such that the user has less time to view their display without looking up while they are traveling faster (e.g., running) versus traveling slower (e.g., walking or stationary).

If a determination is made that the eye-gaze threshold is not exceeded, then method 300 returns to operation 305, where additional eye-tracking data is received. As such, method 300 can loop until an eye-gaze threshold is exceeded.

If a determination is made that the eye-gaze threshold is exceeded, then an alert is issued. This is illustrated at operation 320. The alert can be issued to notify the user that they have been viewing their device beyond the eye-gaze threshold and they should be aware of their surroundings. Alerts can include, but are not limited to, audio, visual and/or haptic feedback.

In some embodiments, the alert can include an audio notification. The audio notification can be an alarm having a particular pitch, tone, frequency, and/or amplitude such that the user is quickly notified of potential danger. In some embodiments, the audio notification can include speech (e.g., "Warning," "Look Up," "Danger," etc.).

In some embodiments, the alert can include visual feedback. The visual feedback can include displaying text (e.g., "Warning"), symbols (e.g., "!!!"), images, etc. on the display of the user's device. In some embodiments, a message is transmitted to the user's device. The message can indicate that the user has been viewing their screen consecutively for "X" seconds, and the user should look up more often to be aware of their surroundings. In some embodiments, the visual feedback issued can include automatically transitioning to an outward camera view on the user's device. This can present the user a view of the real-world and encourage the user to look away from the screen or to view the world through the camera view. This can be implemented to prevent collisions or missteps on behalf of the user.

In some embodiments, the alert can include haptic feedback (e.g., touch sensory feedback). The haptic feedback can include forces, vibrations, and/or motions exhibited by the device. For example, if a user has exceeded an eye-gaze threshold, the device can vibrate such that the user is prompted to be aware of their surroundings.

In embodiments, combinations of alerts can be simultaneously issued. For example, combinations of haptic, audio, and visual feedback can be simultaneously issued to the user (e.g., a warning message is displayed on the user's device with a vibration and beep).

Though FIG. 3 only depicts the issuance of alerts in response to eye-gaze threshold breaches, in embodiments, additional actions can be completed. For example, in some embodiments, the AR application on the user's device can be temporarily paused or closed in response to a breach of an eye-gaze threshold.

In embodiments, in response to exceeding an eye-gaze threshold, the eye-gaze threshold breach can be associated with the location where the breach occurred and stored for later use. For example, a safety profiler (e.g., safety profiler 255 of FIG. 2) can consider the amount of eye-gaze threshold breaches in particular locations when classifying said locations.

The aforementioned operations can be completed in any order and are not limited to those described. Additionally, some, all, or none of the aforementioned operations can be completed, while still remaining within the spirit and scope of the present disclosure.

Figure 4:
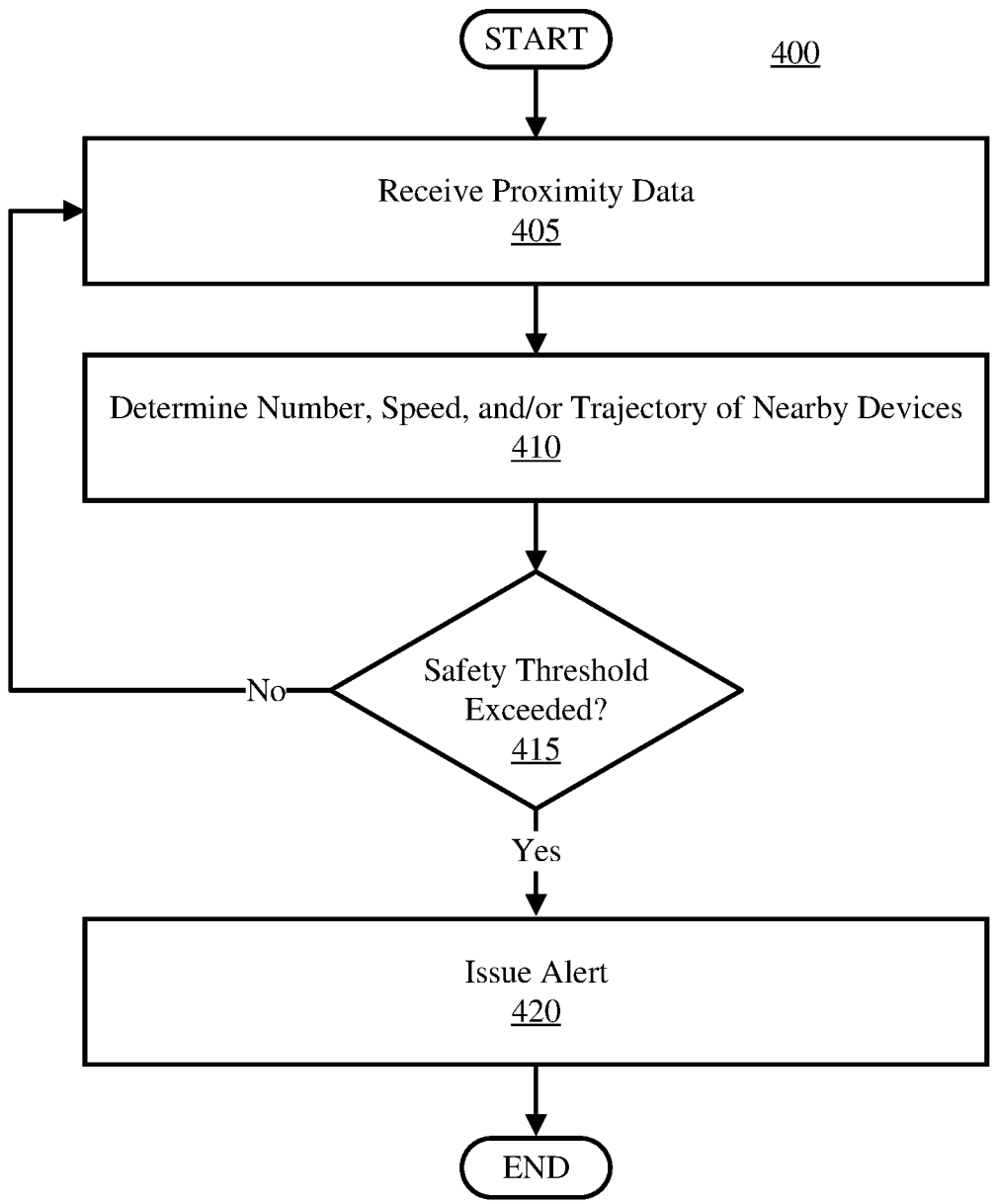
FIG. 4 illustrates a flow diagram of an example method for enhancing safety of an AR application by using proximity detection, in accordance with embodiments of the present disclosure.

Referring now to FIG. 4, shown is an example method 400 for enhancing safety of an AR application (e.g., AR application 130 of FIG. 1 or 220 of FIG. 2) by detecting the number, speed, and/or trajectory of nearby devices, in accordance with embodiments of the present disclosure.

Method 400 initiates at operation 405 where proximity data is received (e.g., by an augmented reality safety overlay (ARSO) of a mobile device). The proximity data can indicate the number, speed, and/or trajectory of nearby devices. As discussed herein, the terms "nearby" or "vicinity" can be defined in any suitable manner. For example, "nearby" and "vicinity" can be defined as any suitable radius around the user's device (e.g., 10 feet, 25 feet, 100 feet, 1 mile, etc.). In some embodiments, the relevant area for safety considerations (e.g., the vicinity) can be based on the technology used to determine the number and/or type of nearby devices. For example, wireless technologies such as BLE and Wi-Fi can have relatively short detection ranges, and thus may lead to a smaller radius for safety considerations. In contrast, GPS technologies may detect devices from many miles away. Accordingly, the safety radius for GPS technologies can be larger than that of wireless technologies. However, in embodiments, the safety radius can be defined (e.g., manually) such that the user is alerted of imminent threats.

In embodiments, the proximity data may be received from a satellite positioning source (e.g., GPS applications such as a map application, a social networking application, an AR application, etc.) which may indicate the position of devices within the vicinity of the user's device. The position of these devices can be updated over time and may allow for the approximation of the speed of the devices.

In some embodiments, the proximity data may be received using wireless technologies such as BLE, Wi-Fi, RFID, UWB, etc. Signals (e.g., the speed, strength, and/or angle of signals) traveling between transmitters (e.g., a first mobile device) and receivers (e.g., a second mobile device) can be used to approximate location. For example, Time of Arrival (TOA), Received Signal Strength Indicator (RSSI), and/or Angle of Arrival (AOA) can be used to approximate the position of a device communicating with the user's device. By measuring the location of the nearby devices with respect to the device having the AR application over time, the speed and trajectory of nearby devices can be calculated (e.g., by measuring the time period between two measured locations).

The number, speed, and/or trajectory of nearby devices are then determined. This is illustrated at operation 410. The number, speed, and/or trajectory of nearby devices are determined based on the proximity data received at operation 405. For example, if, in a given radius (e.g., 100 feet), a first number of devices (e.g., 15) are detected with respective speeds (e.g., based on their change in position over time) at operation 405, the number of devices can be defined as the first number (e.g., 15) and the speed of the devices can be defined as the approximated speed of each respective device. The trajectory of devices can be approximated based on the position updates over time.

A determination is then made whether a safety threshold is exceeded. This is illustrated at operation 415. The safety threshold can be defined to warn the user of the device having the AR application if conditions surrounding the user appear dangerous (e.g., based on the number, speed, and/or trajectory of nearby devices). If a determination is made that a safety threshold is exceeded, an alert action is issued to the user's device. This is illustrated at operation 420.

If a determination is made that a safety threshold is not exceeded, then method 400 returns to operation 405, where additional proximity data is received. Thus, method 400 may continue looping between operations 405-415 until a determination is made that a safety threshold is exceeded.

In embodiments, safety thresholds can be defined in any suitable manner. In some embodiments, safety thresholds are based on the number of devices in the vicinity of the user's device. For example, a first safety threshold can be defined such that a limit of five devices are permitted in the vicinity of the user's device. In this example, if six devices are observed in the vicinity of the user's device, a determination is made that the safety threshold is exceeded (and an alert action can be issued to the user's device at operation 420). Any number of safety thresholds can be implemented. For example, a first safety threshold can be defined as five permitted devices, a second safety threshold can be defined as ten permitted devices, etc. The alerts issued at operation 420 can mirror the exceeded safety threshold (e.g., if the first safety threshold is exceeded, the alert can warn the user that more than five devices are nearby, if the second safety threshold is exceeded, the alert can warn the user that more than ten devices are nearby, etc.).

In some embodiments, safety thresholds can be based on the speed of nearby devices. For example, a safety threshold can define a 40 mph limit for any device in the vicinity of the user's device. In this example, if a device moving beyond 40 mph is detected in the vicinity of the user's device, a determination can be made that the safety threshold is exceeded, and an alert action can be issued at operation 420.

In some embodiments, safety thresholds can be based on the trajectory of nearby devices with respect to the user's device. For example, a safety threshold can be implemented such that if any device within a predetermined distance (e.g., 20 feet) is likely to cross paths (e.g., based on a comparison between the user device trajectory and the nearby device trajectory) with the user's device, an alert is issued.

In some embodiments, safety thresholds can be based on a combination of the number of nearby devices, the speed of nearby devices, and/or the trajectory of nearby devices. For example, a safety threshold can be defined such that if ten devices are nearby and at least three of the nearby devices are moving beyond 25 mph, an alert is issued. In this example, if 12 devices were detected in the vicinity of the user's device, and only two devices were moving beyond 25 mph, the safety threshold would not be exceeded. Similarly, if nine devices were detected in the vicinity of the user's device, and five of the devices were moving beyond 25 mph, the safety threshold would also not be exceeded. However, if 12 devices were detected in the vicinity of the user's device and five of the devices were moving beyond 25 mph, then a determination would be made that the safety threshold was exceeded, and an alert would be issued at operation 420. The number and/or type of safety threshold implemented at operation 415 can vary.

The alerts issued at operation 420 can be the same as, or substantially similar to, the alerts issued at operation 320 of FIG. 3. For example, audio, video, and/or haptic alerts can be issued to the user's device having the AR application. In embodiments, the alerts issued at operation 420 mirror the conditions of the safety threshold breach at operation 415. As an example, if a safety threshold triggers if any nearby device exceeds 50 mph, then the alert can include an audio warning reciting: "Warning, a high speed device is nearby!" Following the example above, the alert could further include displaying a warning message (e.g., a video alert) reading: "Caution!!! A device moving faster than 50 mph was detected nearby!"

Though FIG. 4 only depicts the issuance of alerts in response to safety threshold breaches, in embodiments, additional actions can be completed in response to safety threshold breaches. For example, in some embodiments, the AR application on the user's device can be temporarily paused or closed in response to a breach of a safety threshold.

Though not shown in FIG. 4, the proximity data captured over time can be stored for later use. For example, a table containing the number, speed, and/or trajectory of nearby devices with corresponding time stamps and location tags (e.g., destinations) can be stored and analyzed in the future (e.g., by safety profiler 255 of FIG. 2). The number, speed, and/or trajectory of devices at particular time periods and locations can be used to generate safety scores for regions (at particular time periods). Generating safety scores for regions will be further discussed with reference to FIG. 6.

The aforementioned operations can be completed in any order and are not limited to those described. Additionally, some, all, or none of the aforementioned operations can be completed, while still remaining within the spirit and scope of the present disclosure.

Figure 5:
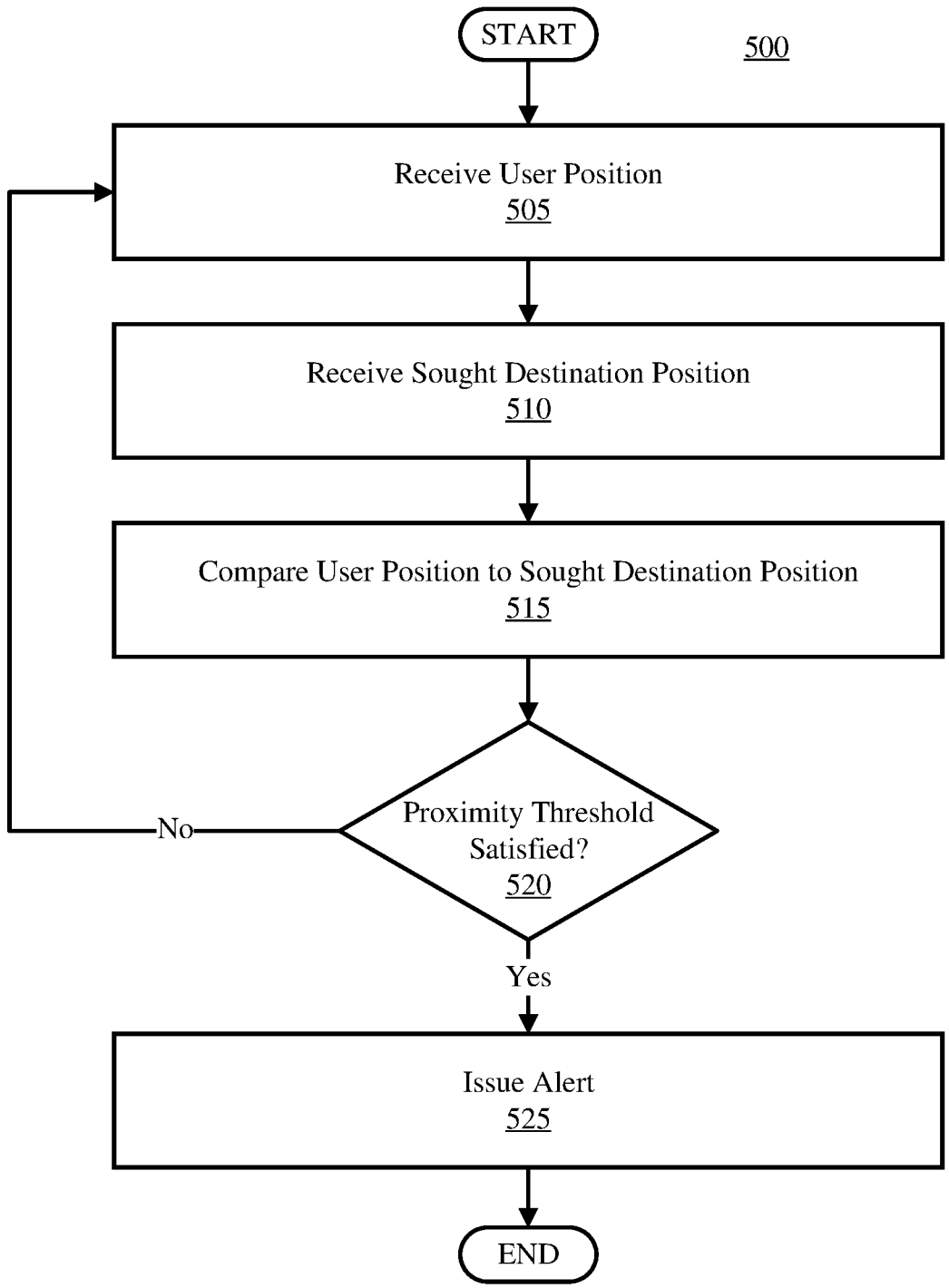
FIG. 5 illustrates a flow diagram of an example method for enhancing safety of an AR application by using position comparison, in accordance with embodiments of the present disclosure.

FIG. 5 is a flow diagram illustrating an example method 500 for enhancing the safety of a device (e.g., mobile device 200 of FIG. 2) having an AR application (e.g., AR application 130 of FIG. 1 or 220 of FIG. 2) using position comparison, in accordance with embodiments of the present disclosure.

Method 500 initiates at operation 505, where a user position is received. The user position can be received via geographic data of a positioning system (e.g., positioning system 210 of FIG. 2). For example, GPS features of the user's device can be used to approximate the location (e.g., GPS coordinates) of the user's position.

A sought destination position is then received. This is illustrated at operation 510. The sought destination position can be selected by a user. For example, if the AR application is a mapping application that guides the user to a physical location (e.g., an address), the sought destination can be an address (e.g., or place of interest) which the user is attempting to reach. As another example, if the AR application is a gaming application which allows the user to track virtual objects or destinations, the sought destination can be a selected virtual object or destination on a virtual map (e.g., with a corresponding physical location mapping). Based on the selected sought destination, a positioning system (e.g., GPS) can be configured to determine the coordinates of the selected destination.

The user position is then compared to the sought destination position. This is illustrated at operation 515. The comparison can output the distance between the user position and the sought destination. In embodiments, the distance between the user position and the sought destination can be based on the available routes (e.g., roads) between the two points (e.g., the user position and the sought destination). For example, in some embodiments, the distance output based on the comparison calculated at operation 515 can be based on the streets that comprise the fastest route between the two points. In some embodiments, however, the distance output based on the comparison can be a line segment between the two points (e.g., independent of available streets or paths).

A determination is then made whether a proximity threshold is satisfied. This is illustrated at operation 520. The proximity threshold defines the distance between the user position and the sought destination at which an alert is issued to the user at operation 525. Thus, if a determination is made that a proximity threshold is satisfied, an alert is issued at operation 525.

If a determination is made that a proximity threshold is not satisfied at operation 520, then method 500 returns to operation 505, where the user position is received. Accordingly, method 500 may loop between operations 505 and 520 until a proximity threshold is satisfied.

The proximity threshold can be any suitable distance (e.g., within 100 meters, within 50 meters, within 10 meters, upon arrival of the sought destination) between the user position and the sought destination at which an alert is issued. For example, if a proximity threshold is set such that within 10 meters, an alert is issued, if a user is 11 meters from the sought destination, the proximity threshold is not satisfied. However, if the user is 7 meters from the sought destination, a determination is made that the proximity threshold is satisfied.

In embodiments, multiple proximity thresholds can be implemented. For example, a first proximity threshold can be defined such that a first alert is issued if a user is within 100 feet of the sought destination, a second proximity threshold can be defined such that a second alert is issued if the user is within 50 feet of the sought destination, and a third proximity threshold can be defined such that a third alert is issued if the user is within 10 feet of the sought destination.

The alert issued at operation 525 can be the same as, or substantially similar to, the alerts issued at operation 320 of FIG. 3 and operation 420 of FIG. 4, respectively. In some embodiments, the intensity (e.g., the decibels for audio alerts or vibration intensity for haptic alerts) of the alert can depend on the distance between the user position and the sought destination. For example, assume a proximity threshold is set such that an audio alert is triggered if the user position is within 20 meters of the sought destination. In this example, upon approaching the sought destination, at 20 meters, the audio alert may be faint (e.g., a quiet alarm). Upon approaching the sought destination, the intensity of the audio alert may heighten (e.g., the alarm gets louder when approaching the sought destination). Upon reaching the destination the audio alert may reach a peak intensity. This provides a "hotter" and "colder" approach to reaching the destination, such that the user can travel the correct direction towards the sought location without needing to look at their device. This can similarly be completed for haptic feedback. For example, the user's device may initiate with a weak vibration, and upon approaching the sought destination, the vibration may intensify. The vibration may then reach a peak intensity just prior to reaching the destination.

The aforementioned operations can be completed in any order and are not limited to those described. Additionally, some, all, or none of the aforementioned operations can be completed, while still remaining within the spirit and scope of the present disclosure.

Figure 6:
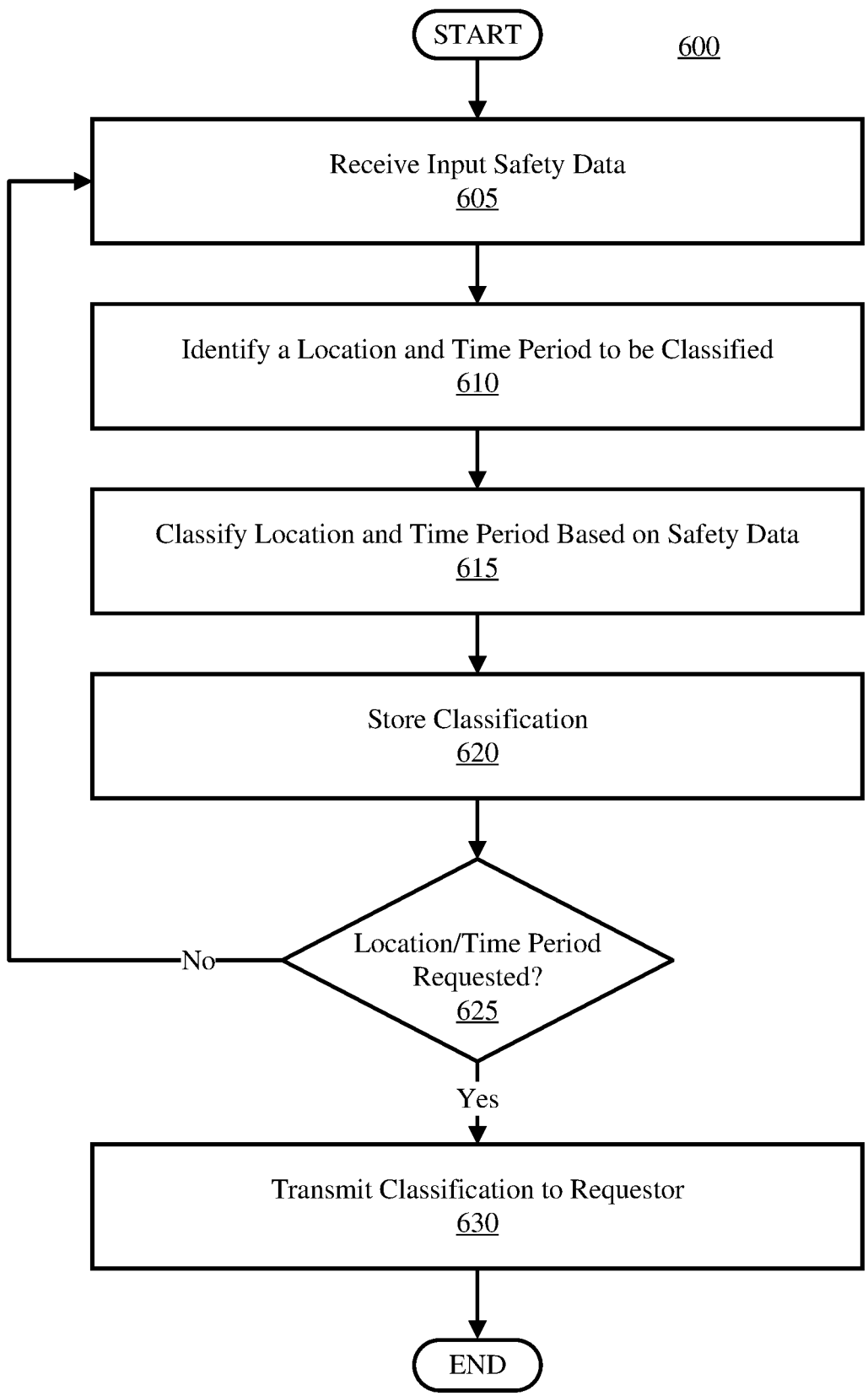
FIG. 6 illustrates a flow diagram of an example method for classifying locations at particular time periods based on input safety data, in accordance with embodiments of the present disclosure.

FIG. 6 is a flow-diagram illustrating an example method 600 for classifying locations based on historical data (e.g., by safety profiler 255), in accordance with embodiments of the present disclosure.

Method 600 initiates where input safety data is received (e.g., by mobile device 200). This is illustrated at operation 605. The input safety data can include a number, speed, and/or trajectory of vehicles indicated in particular locations (e.g., by a plurality of devices having an augmented reality safety overlay) at particular times (e.g., which may indicate the busyness or danger at particular locations). In embodiments, the input safety data can include eye-detection threshold breaches in particular locations at particular times (e.g., which may indicate the attentiveness of users in this area). In some embodiments, input safety data can include geographic topology or features based on satellite technology (e.g., indicating environmental hazards). However, input safety data can be received from any suitable source. For example, in some embodiments, the input safety data can be obtained via the Internet. The input safety data can be obtained from one or more online databases, blogs, journals, websites, etc.

A location and time period to be classified is identified. This is illustrated at operation 610. In some embodiments, the location and time period to be classified may be selected by a user (e.g., seeking to travel to a particular location). For example, the user can seek to use an AR application at a first location, and select the first location for classification (e.g., to determine whether the location is safe for AR use). In some embodiments, locations are classified as data is received for such locations in real-time. Classifications may be updated over time as new input safety data is received.

The location at the particular time period is then classified based on the safety data. This is illustrated at operation 615. The classification can depend on the type of input safety data received at operation 605. For example, if only the number and/or speed of devices are received for a particular location over a particular time period, then the number and/or speed of devices may be the only factors considered when classifying the location. However, in embodiments, multiple safety data inputs can be simultaneously considered when classifying a location at a particular time. For example, the number, speed, and/or trajectory of devices, the number of eye-gaze threshold breaches, and the environmental hazards in a particular location can all be simultaneously considered when classifying the location.

In embodiments, the classification can be based on tiers (e.g., Highly Dangerous, Dangerous, Potentially Dangerous, Relatively Safe, and Safe) and/or a numerical scale (e.g., a scale from 0-100 with 0 being the most dangerous and 100 being the safest). Table 1 depicts an example safety score tier table. Table 1 will be referred to in an example discussed below.

TABLE 1

| Scale | Score |
|---|---|
| Dangerous | 66-100 |
| Intermediate | 33-66 |
| Safe | 0-33 |

Classification can be completed in any suitable manner. In some embodiments, a greater number of devices indicate that a particular region is more dangerous (e.g., a higher chance of collision). In some embodiments, a greater speed of devices indicate that a particular region is more dangerous (e.g., as vehicles/bicycles may frequent this location). In embodiments, a greater number of environmental hazards indicate that a particular region is more dangerous. In some embodiments, a greater number of eye-gaze threshold breaches indicates that a particular region is more dangerous. In some embodiments, data obtained from the Internet may indicate the relative safety of a region (e.g., based on a sentiment analysis of the data).

In embodiments, the various factors which may be considered when classifying a location may be weighed. For example, the speed of devices may account for 50% of the safety classification, the number of devices may account for 15% of the safety classification, the number of eye-gaze threshold breaches may account for 15% of the safety classification, and environmental hazards may account for 20% of the safety classification. The relative weight of factors considered when classifying a region may alter based on the number of available sources.

An example safety classification for a location (e.g., a park) at a particular time period (e.g., 12:00 PM-2:00 PM) is depicted in Table 2 below:

TABLE 2

| | Avg. Number of Devices | Avg. Speed of Devices (mph) | Eye-Gaze Threshold Breaches | Number of Environmental Hazards | Total |
|---|---|---|---|---|---|
| Observed Occurrence | 20 | 8 | 3 | 0 | |
| Safety Limit | 40 | 30 | 15 | 1 | |
| Weight | 0.10 | 0.50 | 0.10 | 0.30 | |
| Safety Score Partition | 0.05 | 0.13 | 0.02 | 0.00 | 0.20 |
| | | | | Total Safety Score | 20 |

As depicted in Table 2, the safety factors for consideration are the average number of devices at the location within the time period, the average speed of devices at the location within the time period, the number of eye-gaze threshold breaches at the location within the time period, and the number of environmental hazards at the location. The observed occurrences at the location within the time period are noted in the second row. In this example, the average number of devices is 20, the average speed of devices is 8 mph, the number of eye-gaze threshold breaches is 3, and the number of environmental hazards is 0.

The safety limit (e.g., shown in the $3^{rd}$ row) defines the magnitude of occurrences required to reach a maximum danger rating for that particular factor. For example, if 40 or more average devices were observed, the danger rating for the number of devices would be 1.00 (e.g., 100%). As another example, if the average speed of devices observed was 15, the danger rating for the average speed of devices would be 0.50 (e.g., 50%). As depicted in Table 2, the danger rating for the average number of devices is 0.50 (e.g., 20/40), the danger rating for the average speed of the devices is 0.27 (e.g., 8/30 rounded up), the danger rating for the number of eye-threshold breaches is 0.20 (e.g., 3/15) and the danger rating for the number of environmental hazards is 0.00 (e.g., 0/1).

The weight of each factor limits the impact that each factor has on the final safety score. As depicted in Table 2, the average number of devices has a weight of 0.10, the average speed of the devices has a weight of 0.50, the number of eye-gaze threshold breaches has a weight of 0.10, and the number of environmental hazards has a weight of 0.30. The danger ratings (e.g., the observed occurrences divided by the safety limit which cannot exceed 1.00 or 100%) are then multiplied by the weight to receive a safety score partition.

The safety score partition for the average number of devices is 0.05 (e.g., 0.50×0.1), the safety score partition for the average speed of the devices is 0.13 (e.g., 0.27×0.50 rounded down), the safety score partition for the number of eye-gaze threshold breaches is 0.02 (e.g., 0.20×0.10), and the safety score partition for the number of environmental hazards is 0.00 (e.g., 0.00×0.30). The safety score partitions are then added to receive the sum of the safety score partitions. In this instance, the sum of the safety score partitions is 0.20 (e.g., 0.05+0.13+0.02+0.00). The sum of the safety score partitions is then multiplied by 100 (to scale the value to the reference scale depicted on Table 1) to attain the total safety score of 20 (e.g., 0.20×100). The total safety score is then referenced against a safety score tier table to obtain the classification. In this example, if the total safety score from Table 2 is referenced against Table 1, then the classification is defined as "Safe," falling between 0-33.

It is noted that this classification technique is merely exemplary. Classification can be completed in any other manner otherwise consistent herein. For example, more or fewer factors may be considered, different arithmetic operations may be completed to obtain a safety score, different safety classification tiers may be formulated, etc. The magnitude and range of the safety tier classifications can vary, and they can be arbitrarily defined.

Once the location and corresponding time period is classified, the classification is stored. This is illustrated at operation 620. In embodiments, the classification can be stored in an ARSO (e.g., ARSO 132 of FIG. 1 or ARSO 225 of FIG. 2), an AR Application (e.g., AR application 130 of FIG. 1 or AR application 220 of FIG. 2), a file, a block of data, or in any other suitable location.

A determination is made whether the location and corresponding time period are requested (e.g., called). This is illustrated at operation 625. If the location and corresponding time period are requested, then the classification is transmitted to the requestor. This is illustrated at operation 630. If a determination is made that the location and corresponding time period are not requested, method 600 returns to operation 605, where input safety data is received. Thus, method 600 may continuously loop between operations 605 and 625 until a location and corresponding time period are requested.

Following the example above, if a user requests the classification for the park between 12:00 PM and 2:00 PM, the safety score of "20" may be transmitted to the user with the classification that the location and corresponding time period is "Safe." After the classification (e.g., the tier and safety score) is transmitted to the requestor, method 600 terminates.

The aforementioned operations can be completed in any order and are not limited to those described. Additionally, some, all, or none of the aforementioned operations can be completed, while still remaining within the spirit and scope of the present disclosure.

Figure 7:
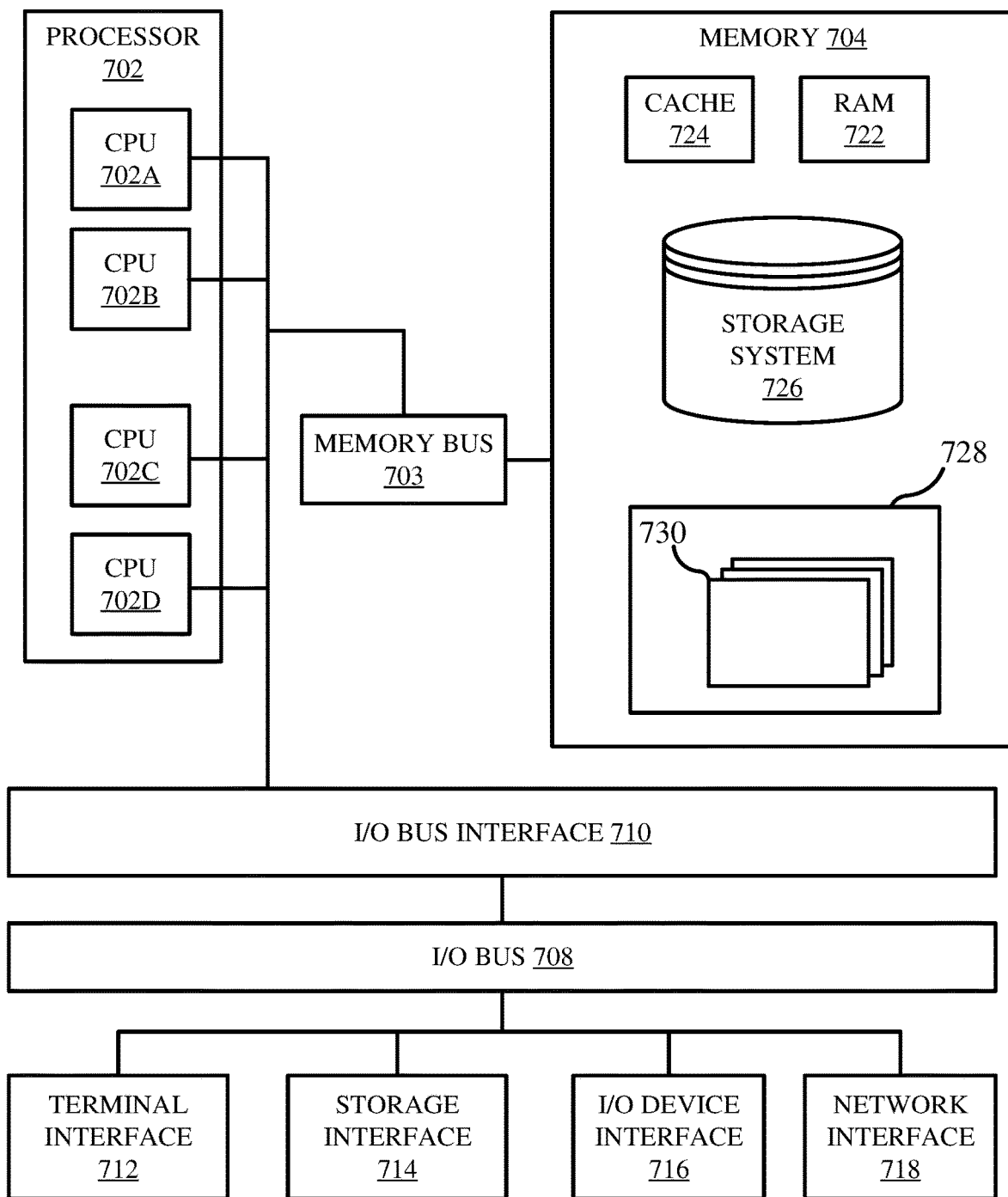
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., client devices 102 and 112, server 122, and mobile device 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 728 and/or program modules 730 generally perform the functions or methodologies of various embodiments.

In some embodiments, the program modules 730 of the computer system 701 include an augmented reality safety module. The augmented reality safety module may include one or more submodules. For example, the augmented reality safety module can include an eye-tracking module configured to warn a user if they are viewing a display of their device beyond a predetermined period, a proximity module configured to determine a number, speed, and/or trajectory of nearby devices and warn a user if the conditions indicate a potentially dangerous environment, and a position comparison module configured to alert a user as they are approaching a sought destination. The augmented reality safety module can further include a classification module configured to classify locations at particular time periods based on input safety data.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
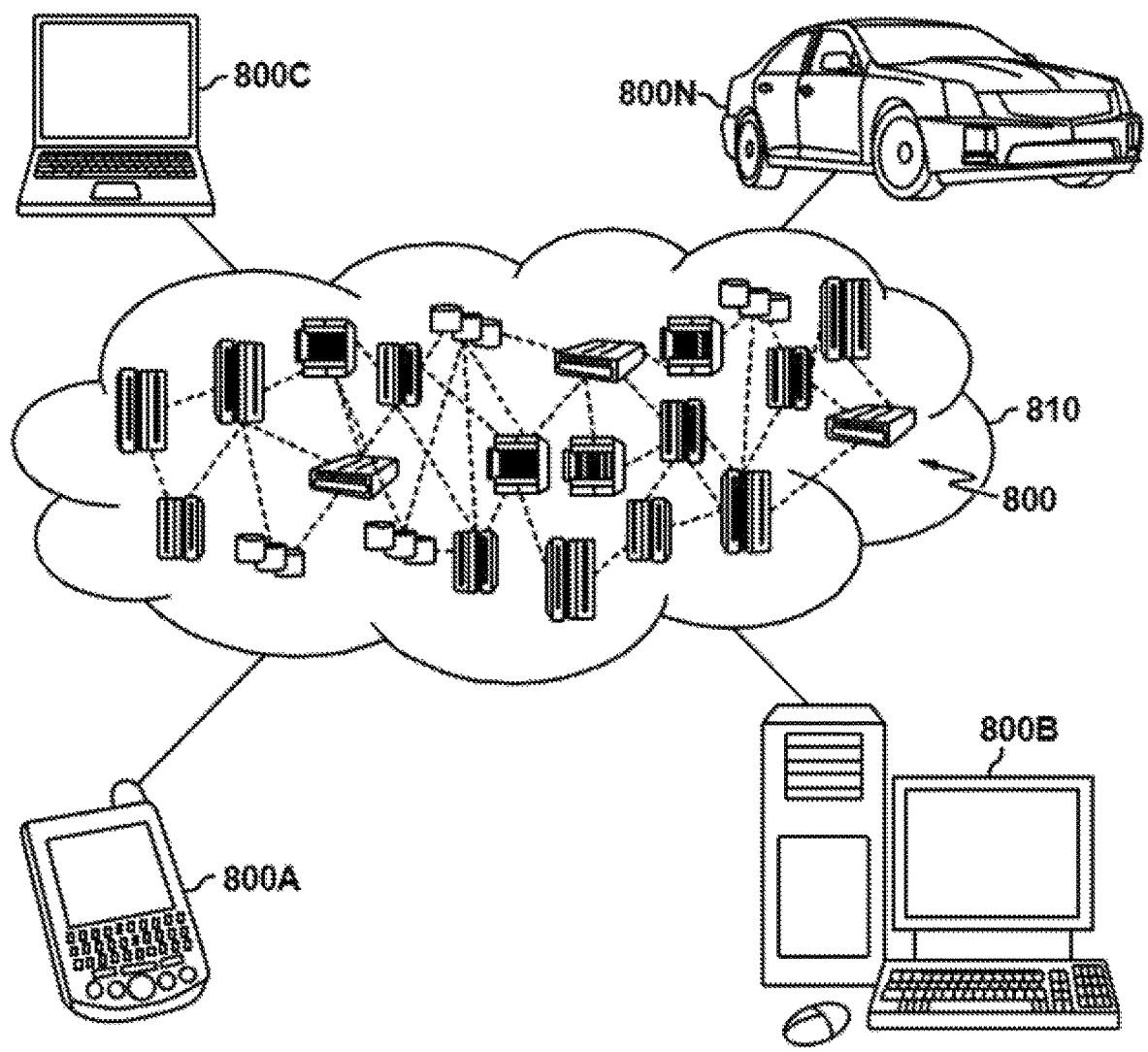
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A (e.g., mobile device 200), desktop computer 800B (e.g., client devices 102 and 112 and server 122) laptop computer 800C (e.g., client devices 102 and 112, server 122, and mobile device 200), and/or automobile computer system 800N (e.g., client devices 102 and 112, server 122, and mobile device 200) can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
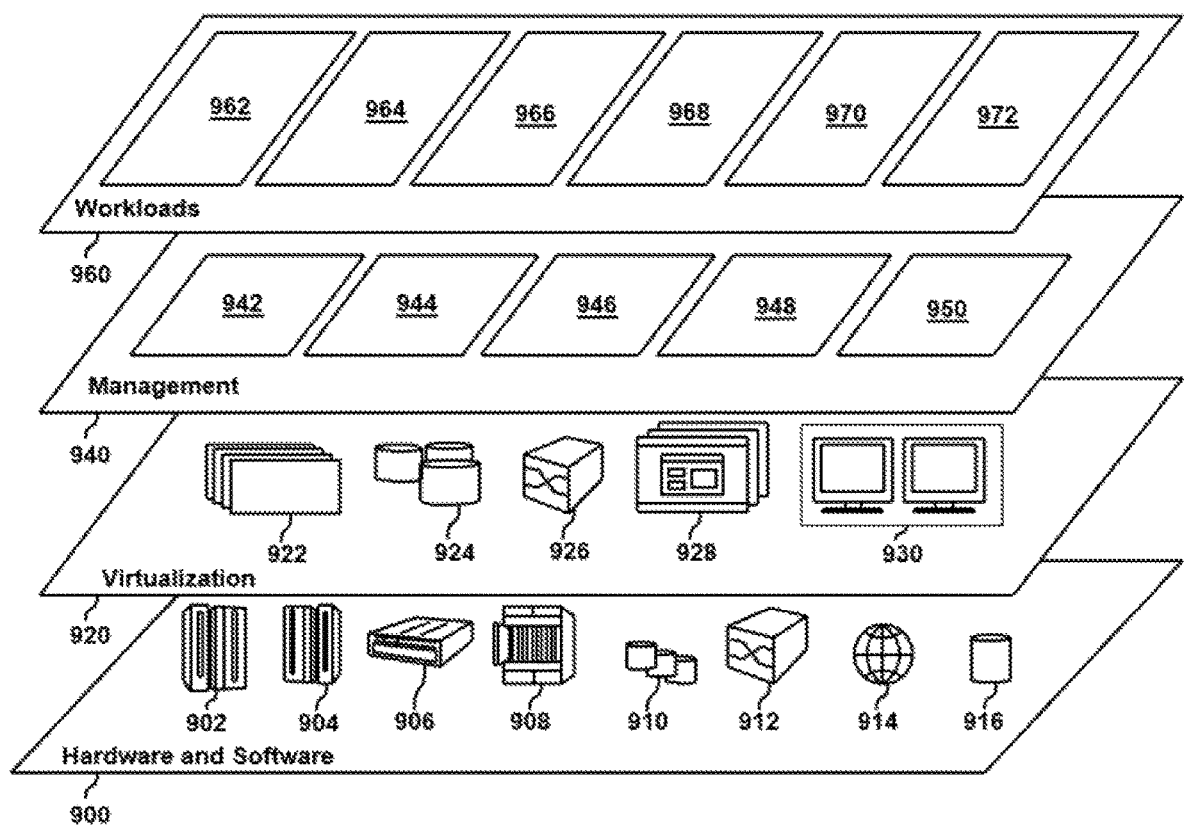
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices (e.g., client devices 102 and 112, server 122, and mobile device 200) which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; proximity detection 964; augmented environment generation 966; eye-tracking 968; transaction processing 970; and data analytics processing 972.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, by a processor, an eye-gaze time indicating a period in which a user using an augmented reality (AR) application is viewing a screen of a mobile device running the AR application;
   comparing, by the processor, the eye-gaze time to an eye-gaze threshold;
   issuing, in response to a determination that the eye-gaze time exceeds the eye-gaze threshold, an alert to the mobile device running the AR application;
   determining that a number of nearby devices exceeds a threshold; and
   reducing, in response to the number of nearby devices exceeding the threshold, the eye-gaze threshold.

2. The method of claim 1, wherein a front-facing camera of the mobile device receives a set of eye-tracking data used to determine the eye-gaze time, wherein the processor determines the eye-gaze time via optical tracking.

3. The method of claim 1, further comprising:
   determining that the number of nearby devices falls below the threshold; and
   increasing, in response to the number of nearby devices falling below the threshold, the eye-gaze threshold.

4. The method of claim 1, further comprising:
   determining that a speed of a nearby device exceeds a threshold; and
   reducing, in response to determining that the speed of the nearby device exceeds the threshold, the eye-gaze threshold.

5. The method of claim 1, further comprising:
   determining that the mobile device is moving at a first speed; and
   reducing, in response to determining that the mobile device is moving at the first speed, the eye-gaze threshold.

6. The method of claim 5, further comprising:
   determining that the mobile device is moving at a second speed, the second speed being lesser than the first speed; and
   increasing, in response to determining that the mobile device is moving at the second speed, the eye-gaze threshold.

7. A system comprising:
   at least one memory storing program instructions; and
   at least one processor communicatively coupled to the at least one memory, wherein the processor is configured to execute the program instructions to perform a method comprising:
   determining an eye-gaze time indicating a period in which a user using an augmented reality (AR) application is viewing a screen of a mobile device running the AR application;
   comparing, by the processor, the eye-gaze time to an eye-gaze threshold;
   issuing, in response to a determination that the eye-gaze time exceeds the eye-gaze threshold, an alert to the mobile device running the AR application;
   determining that a speed of a nearby device exceeds a threshold; and
   reducing, in response to determining that the speed of the nearby device exceeds the threshold, the eye-gaze threshold.

8. The system of claim 7, wherein a front-facing camera of the mobile device receives a set of eye-tracking data used to determine the eye-gaze time, wherein the processor determines the eye-gaze time via optical tracking.

9. The system of claim 7, wherein the method performed by the processor further comprises:
   determining that a number of nearby devices exceeds a threshold; and
   reducing, in response to the number of nearby devices exceeding the threshold, the eye-gaze threshold.

10. The system of claim 9, wherein the method performed by the processor further comprises:
    determining that the number of nearby devices falls below the threshold; and
    increasing, in response to the number of nearby devices falling below the threshold, the eye-gaze threshold.

11. The system of claim 7, wherein the method performed by the processor further comprises:
    determining that the mobile device is moving at a first speed; and
    reducing, in response to determining that the mobile device is moving at the first speed, the eye-gaze threshold.

12. The system of claim 11, wherein the method performed by the processor further comprises:
    determining that the mobile device is moving at a second speed, the second speed being lesser than the first speed; and
    increasing, in response to determining that the mobile device is moving at the second speed, the eye-gaze threshold.

13. A computer program product comprising one or more computer readable storage media, and program instructions collectively stored on the one or more computer readable storage media, the program instructions comprising instructions configured to cause one or more processors to perform a method comprising:
    determining an eye-gaze time indicating a period in which a user using an augmented reality (AR) application is viewing a screen of a mobile device running the AR application;
    comparing, by the processor, the eye-gaze time to an eye-gaze threshold;
    issuing, in response to a determination that the eye-gaze time exceeds the eye-gaze threshold, an alert to the mobile device running the AR application;

determining that the mobile device is moving at a first speed; and reducing, in response to determining that the mobile device is moving at the first speed, the eye-gaze threshold.

14. The computer program product of claim 13, wherein a front-facing camera of the mobile device receives a set of eye-tracking data used to determine the eye-gaze time, wherein the processor determines the eye-gaze time via optical tracking.

15. The computer program product of claim 13, wherein the method performed by the processor further comprises:

determining that a number of nearby devices exceeds a threshold; and reducing, in response to the number of nearby devices exceeding the threshold, the eye-gaze threshold.

16. The computer program product of claim 15, wherein the method performed by the processor further comprises:

determining that the number of nearby devices falls below the threshold; and increasing, in response to the number of nearby devices falling below the threshold, the eye-gaze threshold.

17. The computer program product of claim 13, wherein the method performed by the processor further comprises determining that a speed of a nearby device exceeds a threshold; and reducing, in response to determining that the speed of the nearby device exceeds the threshold, the eye-gaze threshold.

18. The computer program product of claim 13, wherein the method performed by the processor further comprises:

determining that the mobile device is moving at a second speed, the second speed being lesser than the first speed; and increasing, in response to determining that the mobile device is moving at the second speed, the eye-gaze threshold.

\* \* \* \* \*